L. H. FISCHER.
PISTON PIN LOCK.
APPLICATION FILED JUNE 25, 1917.
1,293,068. Patented Feb. 4, 1919.
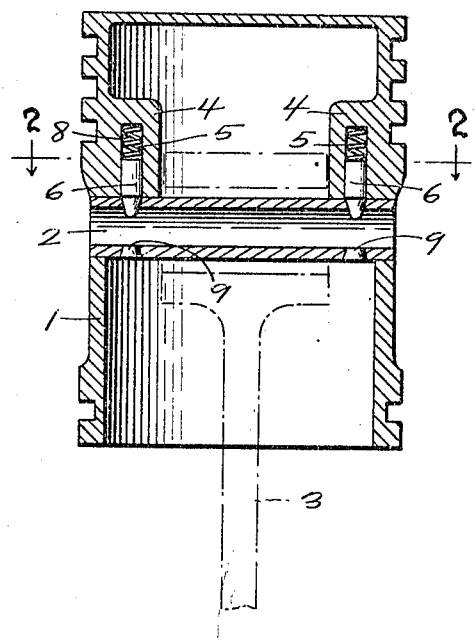
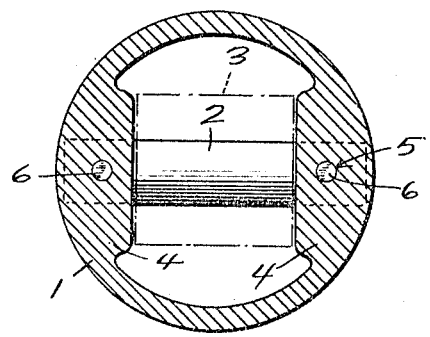
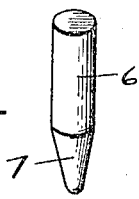
WITNESSES
L. B. James
L. B. Middleton
INVENTOR
Leigh H. Fischer
BY
ATTORNEY

UNITED STATES PATENT OFFICE.

LEIGH H. FISCHER, OF McCORDSVILLE, INDIANA.

PISTON-PIN LOCK.

1,293,068.

Specification of Letters Patent.

Patented Feb. 4, 1919.

Application filed June 25, 1917. Serial No. 176,869.

*To all whom it may concern:*

Be it known that I, LEIGH H. FISCHER, a citizen of the United States, residing at McCordsville, in the county of Hancock and State of Indiana, have invented certain new and useful Improvements in Piston - Pin Locks, of which the following is a specification.

This invention relates to new and useful improvements in pistons and the principal object of the invention is to provide means for securing the piston pin in the piston.

Another object of the invention is to provide means for locking the pin in position by means of spring pressed members which may be forced out of engagement with the pin when it is desired to remove the same.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings, wherein like characters denote like or corresponding parts throughout the several views, and in which:

Figure 1 is a longitudinal sectional view through a piston to which my invention is applied.

Fig. 2 is a section on line 2—2 of Fig. 1.

Fig. 3 shows one of the locking pins.

In these figures 1 indicates the piston, made in any suitable form, and 2 indicates the piston pin for securing the same to the connecting rod 3, shown in dotted lines. I form interior projections 4 on the piston, each projection being diametrically opposite the other, the lower ends extending to a point to engage with the pin 2, and each of these projections having a hole 5 therein extending from a point adjacent its upper edge through the bottom of the projection where it communicates with the opening for the pin 2. A member 6 of cylindrical form and having its lower end pointed as at 7 is inserted in each of these holes and a coil spring 8 located in each hole and engaging the inner end of the member 6 tends to force said member out of the hole. The pin 2 is provided with a pair of openings 9 adjacent each end thereof, one of said openings being diametrically opposite the other pair of openings, said openings being made of cone shape and having their larger part at the outer surface of the pin so that the pointed end 7 of the member 6 has a centering action in connection with these holes.

When the pin is placed in position the member 6 engages with the holes on the upper part of the pin and thus locks the pin in position, and, due to the shape of the holes and the pointed ends of the members, the said pin is caused by the said members to assume its correct position in the piston. By having the enlargements in engagement with the pin a broad bearing surface is provided for the pin at each end thereof.

When it is desired to remove the pin from the piston a pointed tool is passed through the lower opening 9 in the pin to force the member 6 upwardly into the hole 5 so as to disengage it from the pin and after the other member is disengaged from the pin the said pin may be removed from the piston.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

A hollow piston having the usual transverse pin openings therein and having inner projections adjacent the ends of the pin openings and between the latter and the head of the piston, a tubular pin in the pin openings and having a pin of cone-shaped openings near each of its ends, the openings of each pair being opposed, each of said projections having a pocket closed at one end by the material of the projection, and spring actuated lock members mounted in the pockets, each of such members comprising an elongated body having its outer end tapering to enter the adjacent cone-shaped opening of the pin, whereby the tubular pin may be removed by inserting a suitable instrument into the open end of the piston and through the lowermost opening of the tubular pin so as to engage the locking pin and release it from said tubular pin.

In testimony whereof I affix my signature in presence of two witnesses.

LEIGH H. FISCHER.

Witnesses:
 ORLA R. SIMMONS,
 WILLIAM G. KIMBERLIN.